United States Patent
Reynolds, Jr. et al.

(10) Patent No.: US 9,716,947 B1
(45) Date of Patent: Jul. 25, 2017

(54) HEADSET AUDIO SYSTEM (71) Applicant: Plantronics, Inc., Santa Cruz, CA (US)

(72) Inventors: Jack Andrew Reynolds, Jr., Santa Cruz, CA (US); Carl Andrew Kochalko, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 14 days.

(21) Appl. No.: 14/991,441

(22) Filed: Jan. 8, 2016

(51) Int. Cl.
*H04R 1/10* (2006.01)
*H04R 5/033* (2006.01)
*G06F 3/16* (2006.01)
*H04R 5/04* (2006.01)

(52) U.S. Cl.
CPC ............ *H04R 5/033* (2013.01); *G06F 3/165* (2013.01); *H04R 1/1041* (2013.01); *H04R 5/04* (2013.01); *H04R 2430/01* (2013.01)

(58) Field of Classification Search
CPC .. H04R 5/033; H04R 2430/01; H04R 1/1041; H04R 5/04; G06F 3/165
See application file for complete search history.

(56) References Cited

U.S. PATENT DOCUMENTS

| 8,602,892 | B1 | 12/2013 | Reiss et al. | |
|---|---|---|---|---|
| 2002/0118848 | A1* | 8/2002 | Karpenstein | H04H 60/04 381/119 |
| 2005/0159833 | A1 | 7/2005 | Giaimo et al. | |
| 2010/0150383 | A1 | 6/2010 | Sampat | |
| 2011/0130203 | A1 | 6/2011 | Reiss et al. | |
| 2012/0014553 | A1* | 1/2012 | Bonanno | H03G 3/341 381/364 |
| 2012/0283015 | A1 | 11/2012 | Bonanno | |

(Continued)

OTHER PUBLICATIONS

Unknown, "MX10," Plantronics MX10 Product Sheet, 2010, 1 page, found at URL <http://www.plantronics.com/media/media-resources/literature/office_callcenter/mx10_ds_en.pdf>.

(Continued)

*Primary Examiner* — Muhammad N Edun
(74) *Attorney, Agent, or Firm* — Dienwiebel Transatlantic IP (57) ABSTRACT A headset audio system is provided, comprising at least a headset, a control unit, and a control assignment selector, wherein the headset is adapted to provide output audio to a user from at least a first and a second audio signal and the control unit is provided to allow user adjustment of one or more audio parameters and comprises at least a first assignable audio control and a second assignable audio control. To allow the user to select one of the control modes according to the respective application and/or her or his preference, the control assignment selector is configured to switch the assignable audio controls of the control unit between at least a first control mode and second control mode, wherein in said first control mode, the first assignable audio control is configured for adjustment of a main volume of said output audio and the second assignable audio control is configured for adjustment of a mixing level between said at least first and second audio signals; and in said second control mode, the first assignable audio control is configured for adjustment of a volume of said first audio signal, and the second assignable audio control is configured for adjustment of a volume of said second audio signal.

19 Claims, 6 Drawing Sheets

(56) References Cited

U.S. PATENT DOCUMENTS

2014/0185828 A1* 7/2014 Helbling ................ H03G 5/165
　　　　　　　　　　　　　　　　　　　　　　381/103
2015/0065248 A1* 3/2015 LaTendresse ........... A63F 13/10
　　　　　　　　　　　　　　　　　　　　　　463/35

OTHER PUBLICATIONS

Unknown, "Headset Switcher™ Multimedia Amplifier MX10," Plantronics MX10 User Guide, 1998, 16 pages, found at URL <http://www.plantronics.com/media/media-resources/literature/user_guides/MX10_44314i.pdf>.

Unknown, Earforce® ZSeven Tournament Grade Gaming Headset, TurtleBeach Earforce ZSeven User Guide, 2013, 25 pages found at URL <http://www.turtlebeach.com/assets/products/341/z7_userguide.pdf>.

Unknown, Earforce® XPSeven Tournament Grade Gaming Headset, TurtleBeach Earforce XPSeven User Guide, 2013, 30 pages, found at URL <http://www.turtlebeach.com/assets/products/340/xp_seven_user_manual_042413.pdf>.

Unknown, Mixamp™ Instruction Guide, Astro Gaming Mixamp Manual, 2010, 36 pages, found at URL <http://www.astrogaming.com/manuals/MixAmp_manual.pdf>.

* cited by examiner

HEADSET AUDIO SYSTEM

TECHNICAL FIELD

The present invention relates to the field of headphones and headsets, in particular for video game applications.

BACKGROUND

Headsets are being used increasingly in computing applications, such as for teleconferencing, for electronic gaming, or as a human interface device (HID) to interact with a computing device in general. A particular problem exists when more than one audio signal needs to be provided to the headset simultaneously. In such a case, mixing of the respective multiple audio signals is required. However, setting the appropriate mixing level in view of the respective application and the user's preference can be difficult.

In the above-mentioned example of electronic gaming applications, multiplayer games exist where not only game audio (effects and/or music) is provided, but also where an audio chat with further remote players is possible and correspondingly, chat audio is provided in addition to the game audio. Initially available multiplayer games provided game audio through a connected stereo system, while chat audio was typically provided through a mono headset, keeping the two audio signals separate. More recent games and game platforms provide both, game audio and chat audio through a single headset, requiring mixing of the thus present multiple audio signals.

Certainly, when multiple audio signals are present, a user may want to adjust the volume or balance of the multiple audio signals, i.e., the "output mix". In the above-mentioned example of multiplayer games, it may e.g. be desired to adjust the volume of the game audio and the chat audio, so that remote players can be fully understood even in case of the presence of relatively loud game audio, such as due to current game audio effects.

In the mentioned multiplayer gaming applications, a recent game platform allows adjustment of the main volume and additionally provides control of the balance between game and chat audio.

As the present inventors have ascertained, this limited control option results in insufficient flexibility, in particular for multiplayer gaming applications.

Accordingly, an object exists to provide an improved headset audio system allowing an enhanced and precise audio control in case of multiple simultaneous audio sources.

SUMMARY

The following summary of the present invention is provided to facilitate an understanding of some of the innovative features unique to the present invention and is not intended to be a full description. A full appreciation of the various aspects of the invention can be gained by taking the entire specification, claims, drawings, and abstract as a whole.

According to one aspect of the present invention, a headset audio system is provided, comprising at least a headset, a control unit, and a control assignment selector.

The headset is adapted to provide output audio to a user from at least a first and a second audio signal. The control unit is provided to allow user adjustment of one or more audio parameters and comprises at least a first assignable audio control and a second assignable audio control. The control assignment selector is configured to switch the assignable audio controls of the control unit between at least a first control mode and second control mode. In said first control mode, the first assignable audio control is configured for adjustment of a main volume of said output audio and the second assignable audio control is configured for adjustment of a mixing level between said at least first and second audio signals. In said second control mode, the first assignable audio control is configured for adjustment of a volume of said first audio signal and the second assignable audio control is configured for adjustment of a volume of said second audio signal.

The basic idea of this aspect of the present invention is to allow the user to select one of the control modes according to the respective application and/or her or his preference and thus to enable precise and comfortable audio control of the multiple audio signals by the user.

This aspect and other aspects of the invention will be apparent from and elucidated with reference to the embodiments described hereinafter.

DETAILED DESCRIPTION OF PREFERRED EMBODIMENTS

Technical features described in this application can be used to construct various embodiments of headset audio systems, control units for use in a headset audio system, and methods for controlling audio in a headset audio system according to the preceding and following description. Some embodiments of the invention are discussed so as to enable one skilled in the art to make and use the invention.

In the following explanation of the present invention according to the embodiments described, the terms "connected to" or "connected with" are used to indicate a data and/or audio connection between at least two components, devices, units, or modules. Such a connection may be direct between the respective components, devices, units, or modules; or indirect, i.e., over intermediate components, devices, units, or modules. The connection may be permanent or temporary; wireless or conductor based.

For example, a connection may be provided over a WAN (wide area network), LAN (local area network), PAN (personal area network), comprising, e.g., the Internet, Ethernet networks, cellular networks, Bluetooth networks, Zigbee networks, and/or Wi-Fi networks using a corresponding suitable communications protocol. In some embodiments of a system with a wireless headset, a Bluetooth network connection is used to transmit audio to the headset and/or to control the audio.

In a first exemplary aspect, a headset audio system is provided, comprising a headset, a control unit, and a control assignment selector.

The headset is adapted to provide output audio to a user from at least a first and a second audio signal. The headset may be of any suitable type and may comprise one or more drivers/earphones to provide said output audio.

In the context of this application, the term "headset" comprises all types of headsets, headphones, and other head-worn audio playback devices, such as for example circumaural and supra-aural headphones, ear buds, in-ear headphones, and other types of earphones. The headset can be of mono, stereo, or multichannel setup.

The headset in further embodiments certainly may comprise additional components. For example, the headset in one exemplary embodiment may comprise one or more of a microphone to obtain input audio from the user, control electronics to process audio, a wireless communications interface, and a battery.

It is noted that although according to the above, the headset is adapted to provide output audio to a user from at least a first and a second audio signal, it is not required that both of said audio signals are transmitted to the headset. As will be apparent from the following, in some embodiments said at least first and second audio signals are mixed externally of said headset. In these embodiments, an output audio signal is provided to the headset that correspondingly provides the output audio to the user during use when the output audio signal is applied to the respective driver(s)/transducer(s) of the headset. In other embodiments, said at least first and second audio signals are separately provided to the headset for processing and mixing in an audio processor, arranged integrally with the headset.

The term "audio signal" in the present context refers to an analogue or digital representation of audio. For example, the audio signals described herein may be of pulse code modulated (PCM) type, or any other type of bit stream signal. Each audio signal may comprise one channel (mono signal), two channels (stereo signal), or more than two channels (multichannel signal).

The terms "output audio" or "output mix" are used interchangeably and refer to the sound, provided to the user when wearing the headset during use of the system.

As discussed in the preceding, the system according to the first exemplary aspect further comprises the control unit, which comprises at least a first assignable audio control and a second assignable audio control. Certainly the control unit may comprise further components in additional embodiments, such as a mute control and/or an equalizer control.

The at least first and second assignable audio controls allow to set one or more audio parameters, including volume and/or a mixing level, to influence said output audio according to a selected control mode. The at least first and second assignable audio controls can be brought into at least a first and a second control mode by the control assignment selector.

In the first control mode, the first assignable audio control is configured for adjustment of a main volume of said output audio, and said second assignable audio control is configured for adjustment of a mixing level between said at least first and second audio signal, i.e., the "balance" between the at least two audio signals in the output audio. In the second control mode, the first assignable audio control is configured for adjustment of a volume of said first audio signal and the second assignable audio control is configured for adjustment of a volume of said second audio signal.

In the present context, the term "main volume" of said output audio refers to the maximum sound pressure level (SPL) of said output audio, whereas the "volume" of the first and second audio signal refers to the maximum percentage of the absolute SPL, which is provided by the respective signal.

In one exemplary embodiment, the current audio parameters, set by the assignable audio controls, are provided to an audio processor, also referred to as "audio mixer" in the following. The audio processor controls the output audio according to the respectively set control mode and the received audio parameters. It is noted that in some embodiments, said audio processor is provided as a component of the headset system, while in other embodiments, said audio processor is arranged externally, e.g., in an audio source, which is connected with said control unit for receiving the audio parameters.

The control assignment selector, as discussed in the preceding, allows the user to select the preferred control mode, e.g., according to the application and/or the user's preference. To set the respective control mode, the control assignment selector is connected to at least one of said control unit and said audio processor. The control assignment selector in one embodiment is formed integrally with said control unit. In another embodiment, the control assignment selector is provided as a separate component of the headset audio system. In one further embodiment, the control assignment selector comprises a suitable actuator to set the respective control mode. For example, the actuator may be a sensor, such as a touch (capacitive) sensor. In another example, the actuator is a mechanical actuator, such as a button, switch, or dial. In another additional or alternative embodiment, the setting of the control assignment selector is adjusted electronically, e.g., by a software routine or program of a connected suitable processor.

In an additional embodiment, the control assignment selector is configured to allow user selection from more than two control modes. The present embodiment is, e.g., useful in case more than two audio signals are being provided. For example and in the latter case, a third control mode may be provided, in which said first assignable audio control is configured for adjustment of a mixing level between said first and second audio signals, while the second assignable audio control is configured for adjustment of a volume of a third audio signal.

In another alternative or additional embodiment, the control unit is connectable between the headset and an audio source. The connections between the control unit and the audio source as well as the control unit and the headset may be wired (conductor based) and/or wireless. In one additional embodiment, the control unit comprises a housing with one or more suitable sockets for conductor-based connections to the headset and/or the audio source.

The audio source may be of any suitable type. In the context of electronic (video) gaming, the audio source may be a computer, tablet, smart phone, mobile gaming device, digital media player, video game console system, or other type of computing device.

In another embodiment, the control unit is connectable to a detachable playback device of said audio source, such as a remote control. In case the audio source is a video game console system, the control unit, e.g., may be connectable to a game controller of said game console. The connection may be wired (conductor based) or wireless. In an additional embodiment, the control unit comprises a housing with a connecting section that is adapted to form-fit the respective playback device and/or game controller.

In a further embodiment, the headset and the control unit are formed integrally with each other. The present embodiment provides an even more compact setup and in case of a wireless headset, increases the mobility of the user during use of the system.

In another embodiment, the headset audio system additionally comprises the audio processor, as discussed above. The audio processor is connected with the headset and with the control unit. The audio processor receives one or more audio parameters from the control unit and is configured to process said first and second audio signals according to the received audio parameters to obtain the output audio signal. The output audio signal is provided to the headset to provide in turn the corresponding output audio to the user during use.

In one example, the audio processor provides the output audio signal as an output mix of the at least first and second audio signals according to the current audio parameters, including the settings of the assignable audio controls and the currently set control mode.

The audio processor according to the present embodiment may be of any suitable type to provide said output audio signal. For example, the audio processor may comprise a digital signal processor (DSP). In another example, the audio processor comprises an analogue circuit for audio signal mixing, such as using an LM3900 quadruple operational amplifier, available from Texas Instruments, Inc.

The audio processor in one embodiment is formed as a separate component of the headset system. In another embodiment the audio processor is formed integrally with the control unit and/or the headset, which provides a relatively compact setup. According to a further embodiment, the audio processor is connectable to the audio source to receive said at least first and second audio signals.

As discussed in the preceding, the at least first and second assignable audio controls allow to set one or more audio parameters, such as volume or mixing level, according to the respective control mode.

The assignable audio controls may be of any suitable tangible type to allow adjustment of the respective audio parameter, including analogue (stepless) and digital controls. In the latter case, the controls should allow a plurality of steps, i.e., more than two steps. In one embodiment, the number of steps is selected, so that an adjustment of volume and/or mixing level is perceived as "quasi-stepless" by the user, i.e., that two adjacent steps only provide a small audible difference in volume to the user.

In one embodiment, the assignable audio controls are touch sensors, e.g., capacitive touch sensors. In one further embodiment, the first and second assignable audio controls are mechanical controls. For example, the first and second assignable controls may comprise knobs, dials, faders, wheels, buttons, or any other suitable type of mechanically controllable device, so as to enable the setting of the respective audio parameter by the user.

In another additional or alternative embodiment, the assignable audio controls are rotary encoders/controls. This type of control allows a fast and easy adjustment, even during game play in electronic gaming applications.

In one further embodiment, the first and second assignable audio controls are rotary controls and are arranged in a stacked relationship, so that an axis of rotation of said first assignable rotary audio control at least substantially corresponds to an axis of rotation of said second assignable rotary audio control.

In another additional or alternative embodiment, the assignable audio controls each comprise a visual and/or haptic setting indicator, so that the setting of the respective audio parameter can be determined by the user easily. The present embodiment is particularly useful in electronic gaming applications, since an adjustment of the respective control is possible without substantial distraction from the game play. The setting indicator in one embodiment may comprise a marking on an analog control to show relative setting. In another embodiment, such as when using "digital rotary controls", i.e. controls, that rotate continuously and having no mechanical stop, the setting indicator may be of electronic type, e.g., using an LED to show the setting of the respective audio parameter. In another embodiment, an onscreen indication of the respective setting is used.

It is noted that although the first and second assignable audio controls may comprise the same type of control, it is possible in another embodiment that the first and second audio controls comprise different types of controls, such as for example a control knob and a linear control fader. In another embodiment, the assignable audio controls can be assigned to control further functions of the user interface, e.g., by a corresponding software setting.

In another embodiment, the headset comprises a microphone to record user audio. The microphone may be of any suitable type including electret and condenser microphones. The microphone in one example is a noise-cancelling microphone. The microphone may be mounted on a microphone boom and/or may be cable-mounted. In one further embodiment, the recorded user audio is mixed into the output audio as a microphone monitor signal, to provide the user with audio feedback of his own chat audio.

According to another alternative or additional embodiment, the headset audio system is configured to provide output audio from at least a first, a second, and a third audio signal. For example, in a multiplayer electronic gaming application, it is possible that separate audio signals are provided for game music, game effects, and chat audio. In an additional or alternative example, the headset system comprises an aux-in port so that the user can externally provide his preferred music or local chat audio. The aux-in port in one embodiment is formed integrally with the control unit.

The volume of the third audio signal in the output audio and/or the mixing level of the third audio signal with the other audio signals, respectively, may be fixed in one embodiment. In another embodiment, the volume or mixing level of the third audio signal is adjustable.

According to a further alternative or additional embodiment, the control unit additionally comprises a third assignable audio control. This embodiment may be particularly useful in case of the provision of more than two audio signals, as discussed in the preceding paragraphs. Alternatively or additionally, a third control mode may be present, as discussed above with reference to the control assignment selector.

In another embodiment, the headset system comprises an audio compressor, which allows the volume of one of the audio signals to be controlled relative to the volume of the one of the other audio signals. For example, the audio compressor may be configured to keep a predefined difference in volume, so that one of the audio signals always is louder than the other audio signals. In the exemplary application of multiplayer electronic gaming, the audio compressor allows to automatically keep the chat audio perceivable, independent of the current volume of the game sound. It is noted that also here, the at least first and second assignable audio controls set the respective maximums as discussed in the preceding.

In a further embodiment, the headset system is configured for (electronic/video) gaming applications, wherein said first audio signal comprises user chat audio and said second audio signal comprises game sound.

In a second exemplary aspect, a control unit for a headset audio system that provides output audio to a user from at least a first and a second audio signal is provided. The control unit may be configured according to one or more of the embodiments described in the preceding and following description.

In a third exemplary aspect, a method of controlling audio in a headset audio system comprising a headset and a control unit is provided. The control unit comprises at least a first assignable audio control and a second assignable audio control; wherein said assignable audio controls are switched between at least a first control mode and a second control mode. The headset and the control unit may be configured according to one or more of the embodiments described in the preceding and following description.

Reference will now be made to the drawings in which the various elements of embodiments will be given numerical designations and in which further embodiments will be discussed.

Specific references to components, process steps, and other elements are not intended to be limiting. Further, it is understood that like parts bear the same reference numerals, when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

Figure 1:
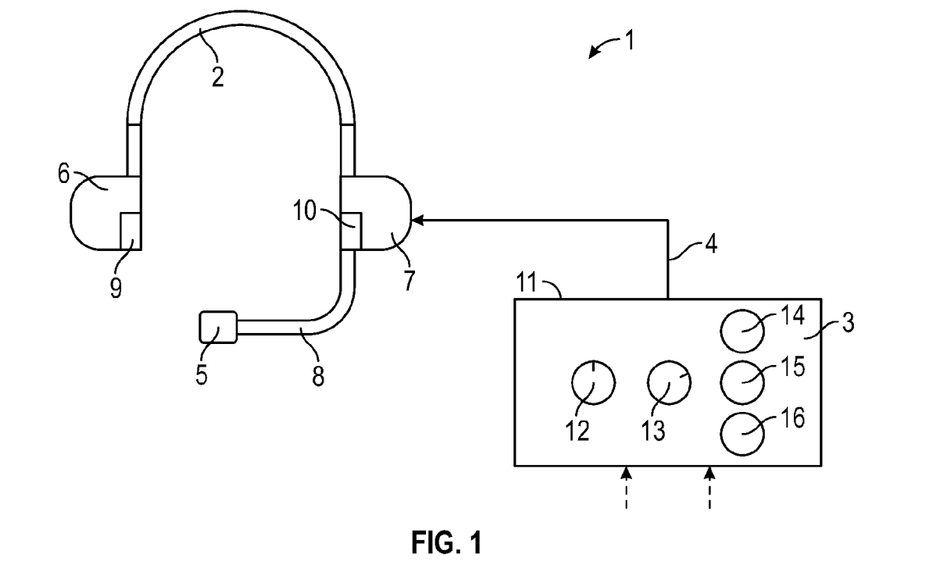
FIG. 1 shows a first embodiment of a headset system according to the invention comprising a headset and a control unit in a schematic view.

FIG. 1 shows a first embodiment of a headset audio system 1 in a schematic view. The system 1 is adapted for electronic (video) gaming applications and comprises a headset 2 and a control unit 3, which are connected with each other over cable connection 4.

The headset 2 comprises two earphone housings 6, 7 with corresponding drivers 9, 10 to provide output audio to a user. Microphone 5 is mounted on boom 8 to record user chat audio, particularly for multiplayer video games.

Control unit 3 comprises a housing 11 with multiple user-adjustable controls, namely a first assignable audio control 12, a second assignable audio control 13, a control assignment selector 14, an equalizer control 15, and a mute control 16. While assignable audio controls 12, 13 are rotary, knob-type controls with visual and haptic setting indicators; control assignment selector 14, equalizer control 15, and mute control 16 are mechanical buttons to adjust the respective setting.

Figure 2:
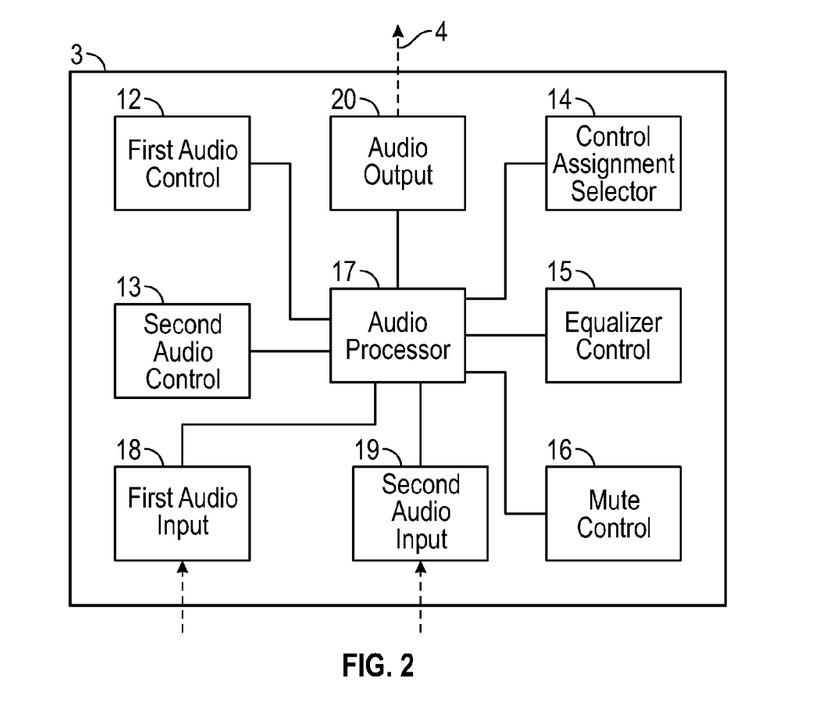
FIG. 2 shows the control unit of FIG. 1 in a schematic block diagram.

As can be seen from the block diagram of control unit 3 according to FIG. 2, the unit 3 further comprises an audio processor 17, a first audio input 18, a second audio input 19, an audio output 20, and a battery (not shown). Audio output 20 is connected with headset 2 over connection 4. The two audio inputs 18, 19 are provided to receive a first and a second audio signal, respectively, which are provided by an external audio source (not shown), such as a game console system. The two audio inputs 18, 19 are connected to the audio processor 17, which processes the signals received from the audio source to provide an output audio signal to headset 2 through audio output 20 and cable connection 4. The audio inputs 18, 19 and the audio output 20 according to the present embodiment comprise typical 3.5 mm audio sockets. Audio output 20 also comprises a headphone amplifier circuit (not shown).

According to the present embodiment, audio processor 17 is a digital audio processor (DSP) available from NXP Semiconductors/Freescale. As discussed in the preceding, audio processor 17 generates the output audio signal to headset 2 to provide output audio to the user. The output audio signal is generated by audio processor 17 from the first and second audio signals, as applied to audio inputs 18, 19 during use of the system 1. In the present embodiment of electronic gaming applications, the first audio signal comprises stereo game sound (sound effects/music) and the second audio signal comprises mono chat audio of other users of a multiplayer game. The audio processor 17 mixes the two audio signals to provide the output audio signal that in turn provides the output audio at the headset 2 to the user.

To allow influencing the mixing of the two audio signals by the user, the first and second assignable audio controls 12, 13 are provided. The respective control functionality of the audio controls 12, 13 is configurable or assignable according to a first and a second control mode. The control mode is user-selectable using control assignment selector 14 of control unit 3.

In the first control mode, the first assignable audio control 12 allows adjustment of the main volume of the output audio, while the second assignable audio control 13 allows adjustment of the mixing level or the "balance" between the first audio signal (game sound/music), received through first audio input 18, and the second audio signal (chat audio), received through second audio input 19.

If the control assignment selector 14 is set to the second control mode, the first assignable audio control 12 allows adjustment of the volume of the first audio signal (game sound/music) and the second audio control 13 allows adjustment of the volume of the second audio signal (chat audio).

To allow the audio processing according to the two control modes, the two assignable audio controls 12, 13 and the control assignment selector 14 are connected to audio processor 17. Both assignable audio controls 12, 13 provide digital audio parameters corresponding to their respective settings to the audio processor 17, which is then interpreted according to the present setting of the control assignment selector 14, i.e., the respective control mode.

The control mode depends on the user's selection and her or his according preference for the game play. The audio processor 17 according to the present embodiment stores the latest setting of the control mode internally, so that when the control unit 3 is powered off, the latest user setting is maintained.

As discussed in the preceding, the control unit 3 according to the present embodiment further comprises equalizer control 15 and mute control 16, both of which are also connected to audio processor 17. While the equalizer control 15 allows the user to adjust the overall sound of the output audio according to predefined equalizer presets stored in the audio processor 17, the mute control 16 allows to disable the audio output 20, e.g., for temporarily disabling the audio output of headset 2. It is noted that microphone 5 is connected with audio processor 17 over a corresponding audio input connection, which is not shown in the FIGS. for reasons of clarity. Audio processor 17 digitizes the recorded user chat audio and provides the digitized user chat audio to the audio source over a wired or wireless connection (also not shown).

Figure 3:
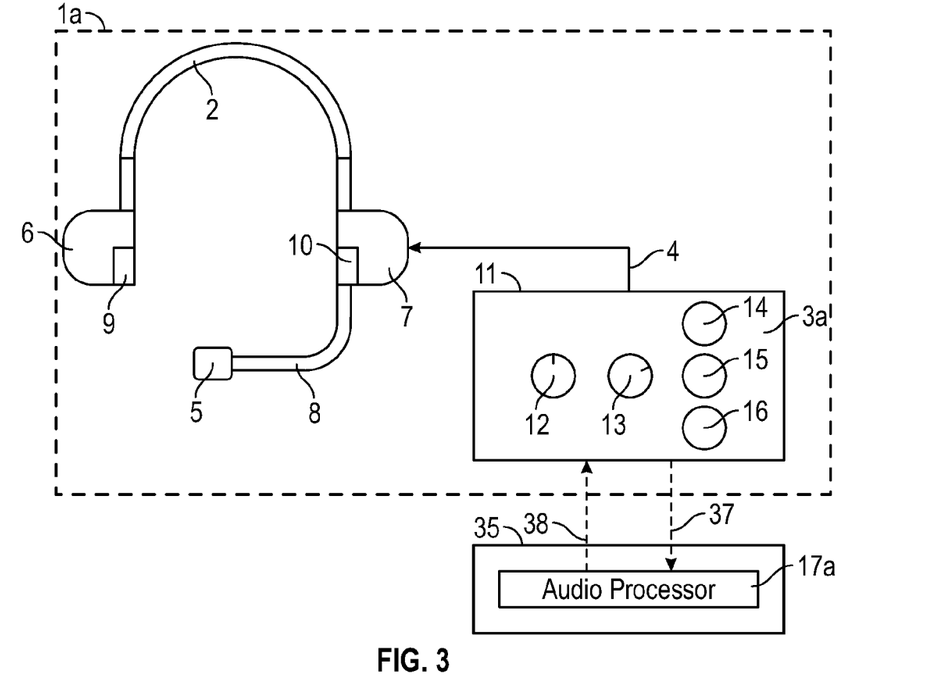
FIG. 3 shows a second embodiment of a headset system according to the invention comprising a headset and a control unit in a schematic view.
Figure 4:
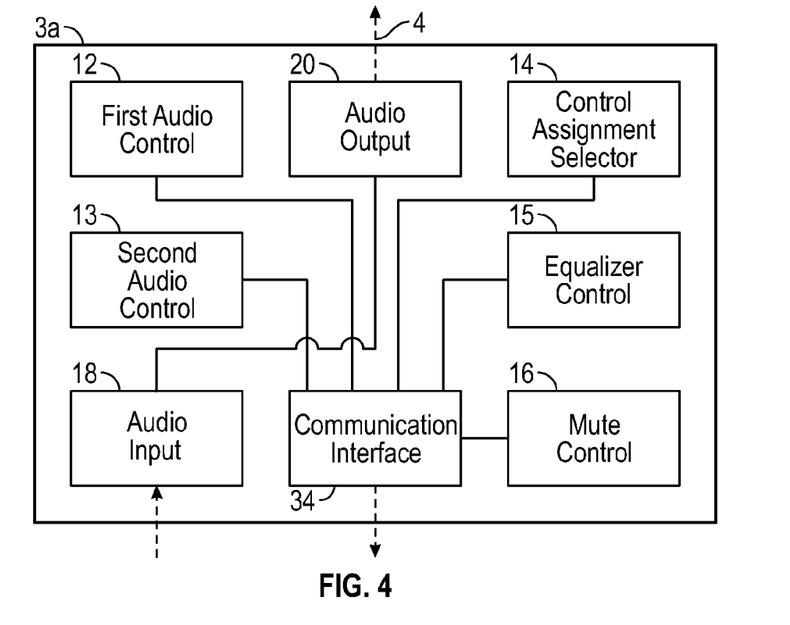
FIG. 4 shows the control unit of FIG. 3 in a schematic block diagram.

FIGS. 3 and 4 show a further embodiment of headset audio system 1a in schematic views. Headset audio system 1a corresponds to headset audio system 1 with the exception of control unit 3a. As can be seen from the schematic block diagram of FIG. 4, control unit 3a does not comprise the aforementioned audio processor 17 and only a single audio input 18. Instead of the audio processor, control unit 3a comprises a communication interface 34. Audio input 18 in this embodiment is adapted to receive a "pre-mixed" audio signal over audio connection 38 from an audio source, which according to FIG. 3 is a video game console system 35 with an internal audio processor 17a. The audio processor 17a in this embodiment thus is provided externally of the headset audio system 1a. The received pre-mixed audio signal is then passed to audio output 20 and consequently to headset 2.

The functionality of the audio processor 17a corresponds to the preceding discussion of audio processor 17. In particular, audio processor 17a provides the pre-mixed audio signal from the first and second audio signal, i.e., the game sound audio signal and the chat audio signal of a multiplayer game.

The audio processor 17a is also in this embodiment controlled by the various controls of the control unit 3a, as discussed in the preceding with reference to FIGS. 1 and 2. For this purpose, communication interface 34 is provided and connected with the first and second assignable audio controls 12, 13, the control assignment selector 14, equalizer control 15, and mute control 16. The communication interface 34 transmits the respective control parameters of the controls 12-16 to the external audio processor 17a via a control connection 37 using a suitable protocol. The communication interface 34 in this embodiment also transmits the user chat audio, recorded by microphone 5 to the external audio processor 17a over control connection 37. For example, the control connection 37 may use the USB HID protocol or the Gaming Interface Protocol.

Figure 5A:
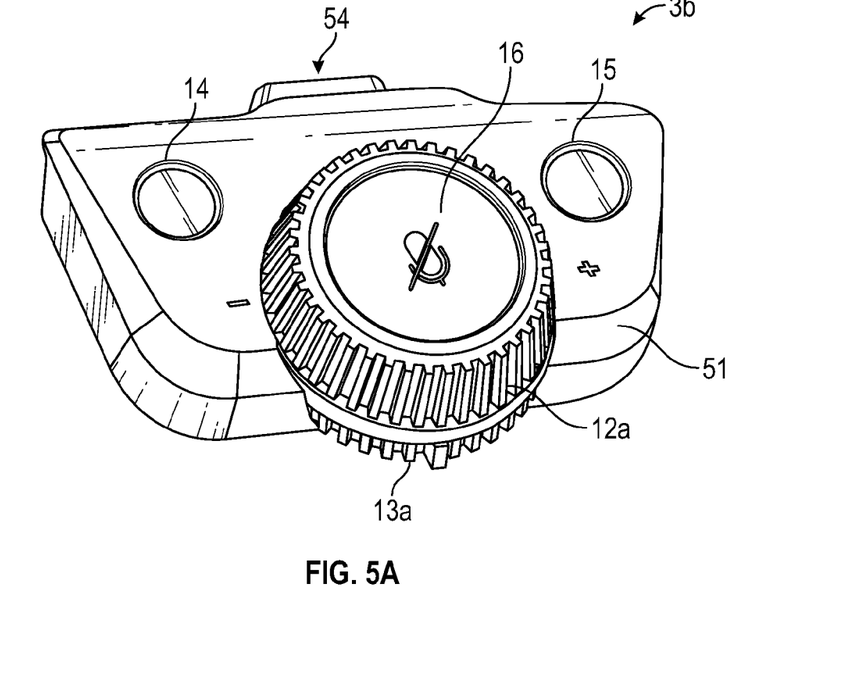
FIGS. 5A-5C show an embodiment of a control unit for use in a headset system in perspective views.
Figure 5B:
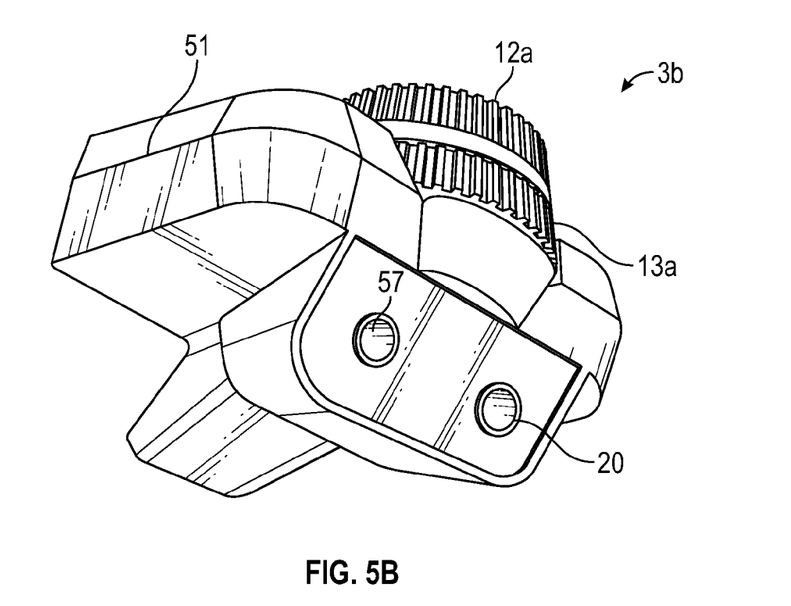
Figure 5C:
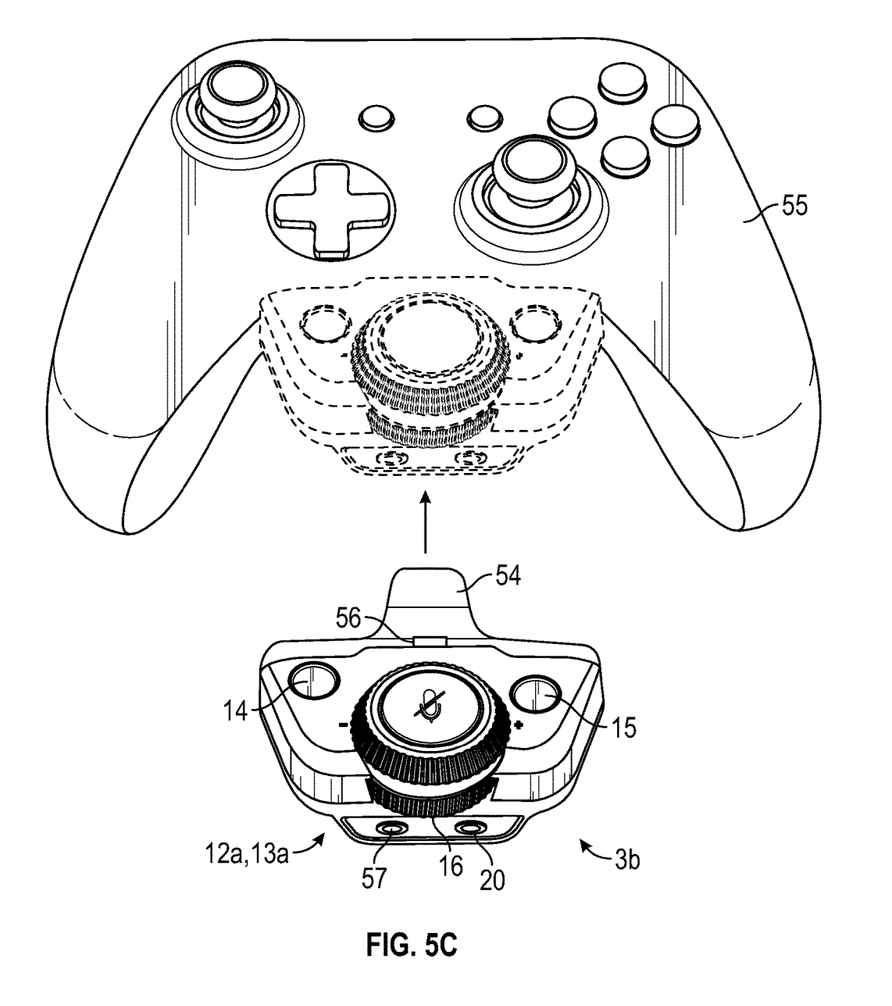

FIGS. 5A-5C show a further embodiment of a control unit 3b for a headset system 1, 1a in various perspective views. The internal configuration of control unit 3b substantially corresponds to the preceding discussion of FIGS. 3 and 4, with the exception of an additional aux-in port 57, which allows the user to listen to his own music while playing. The aux-in port 57 gets mixed with the output audio immediately prior to the amplifier in audio output 20 without any volume control provided in this embodiment.

As is apparent from the FIGS., the external configuration of control unit 3b and in particular of housing 51 and the assignable audio controls 12a, 13a differs from the preceding discussion.

As will be apparent from FIG. 5C, the housing 51 of control unit 3b comprises a connecting section 54 that is adapted to form-fit a game controller 55 of video game console system 35. The connecting section according to the present embodiment comprises a connector 56 to provide audio connection 38 and control connection 37 when the control unit 3b is connected with the game controller 55.

In addition to the above, the first and second assignable audio controls 12, 13 according to the present embodiment are configured as rotary dials, stacked on top of each other so that the axis of rotation of first assignable audio control 12 corresponds to the axis of rotation of second assignable audio control 13. The present "stacked" setup allows for a quick and easy audio adjustment by the user with a thumb of the user's hand, even while holding the game controller 55.

It is noted that in an alternative embodiment, buttons 14 and 15 could be provided as a single button having two functions, namely selecting an equalizer preset when pressed short and changing the control mode when pressed long, i.e., longer than a predetermined period of time.

Figure 6:
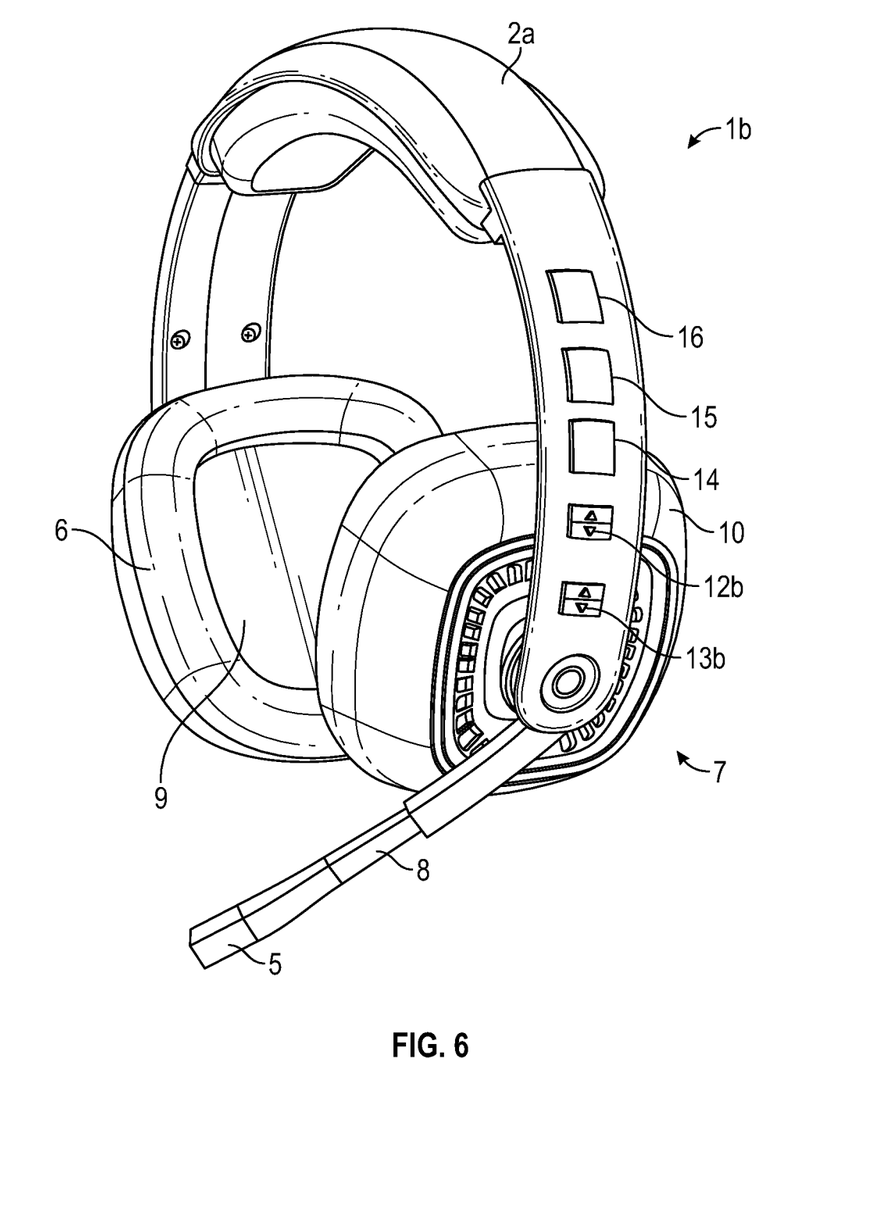
FIG. 6 shows a further embodiment of a headset system according to the invention.
Figure 7:
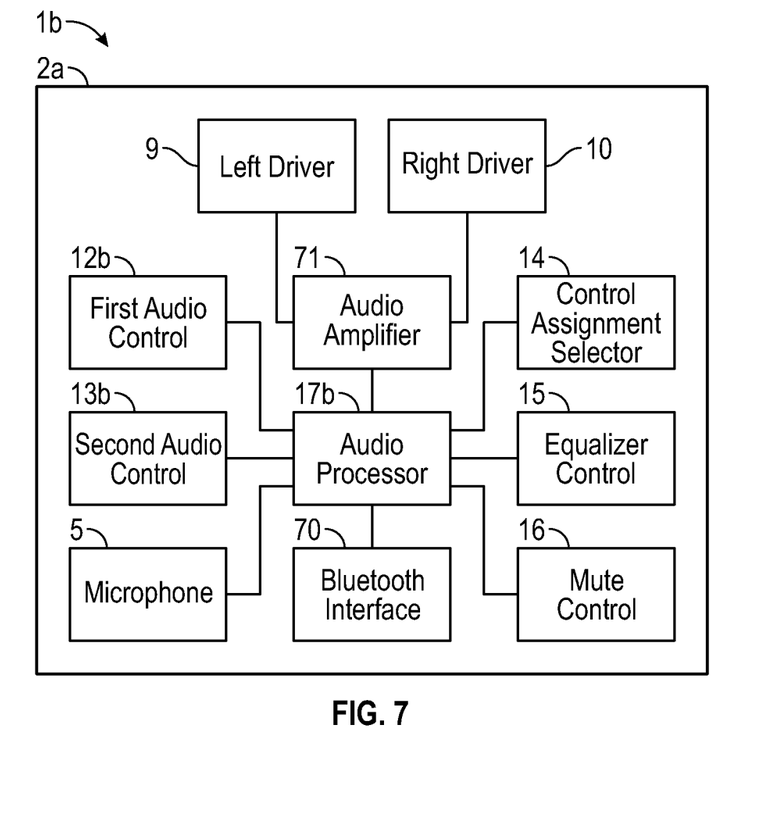
FIG. 7 shows a block diagram of the headset system of FIG. 6.

FIGS. 6 and 7 show a further embodiment of a headset system 1b. The headset system 1b corresponds to the headset system 1, as discussed in the preceding with reference to FIGS. 1 and 2, with the exception that the headset 2a is a wireless Bluetooth headset and that the components of the discussed control unit 3 are integrated into headset 2a, as can be seen in particular from FIG. 7.

Headset 2a comprises a Bluetooth interface 70, which is adapted to receive the first and second audio signals from the audio source (not shown), i.e., the game console system. The Bluetooth interface 70 further transmits the user chat audio, as obtained from noise-cancelling microphone 5 back to the audio source. Audio processor 17b in the present embodiment is connected with an audio amplifier 71 and provides the output audio signal to the amplifier 71. The latter correspondingly drives the left and right drivers 9, 10 of the headset 2a. Furthermore, the headset 2a comprises an internal rechargeable battery (not shown) to provide power to its electrical components.

The operation of headset 2a and in particular the audio control of the first and second assignable audio controls 12b, 13b corresponds to the preceding discussion of the embodiment of FIGS. 1 and 2 which the exception that the assignable audio controls 12b, 13b according to the embodiment of FIGS. 6 and 7 are rocker switches.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A headset audio system with at least
a headset to provide output audio to a user from at least a first and a second audio signal;
a control unit, provided to allow user adjustment of one or more audio parameters; said control unit comprising at least
a first assignable audio control, and
a second assignable audio control; and
a control assignment selector, configured to switch the assignable audio controls between at least a first control mode and second control mode; wherein
in said first control mode, the first assignable audio control is configured for adjustment of a main volume of said output audio and the second assignable audio control is configured for adjustment of a mixing level between said at least first and second audio signals; and in said second control mode, the first assignable audio control is configured for adjustment of a volume of said first audio signal, and the second assignable audio control is configured for adjustment of a volume of said second audio signal.

2. The headset audio system of claim 1, wherein said control unit is connectable between the headset and an audio source.

3. The headset audio system of claim 2, wherein said control unit is connectable to a detachable playback device of said audio source.

4. The headset audio system of claim 3, wherein said audio source is a game console and the detachable playback device is a game controller.

5. The headset audio system of claim 3, wherein the control unit comprises a housing with a connecting section, the connecting section being adapted to form-fit the detachable playback device.

6. The headset audio system of claim 1, wherein said control assignment selector is formed integrally with said control unit.

7. The headset audio system of claim 1, wherein said headset and said control unit are formed integrally with each other.

8. The headset audio system of claim 1, further comprising an audio processor, said audio processor being connected with the headset and with the control unit to receive one or more of said audio parameters; said audio processor being configured to process said at least first and second audio signals according to the received audio parameters to obtain an output audio signal and to provide said output audio signal to the headset.

9. The headset audio system of claim 8, wherein the audio processor is connectable to an audio source for receiving said at least first and second audio signals.

10. The headset audio system of claim 8, wherein the audio processor is formed integrally with said control unit.

11. The headset audio system of claim 1, wherein said first and second assignable audio controls are assignable mechanical controls.

12. The headset audio system of claim 1, wherein said first and second assignable audio controls are assignable rotary controls.

13. The headset audio system of claim 12, wherein said assignable rotary controls are arranged in a stacked relationship, so that an axis of rotation of said first assignable rotary audio control at least substantially corresponds to an axis of rotation of said second assignable rotary audio control.

14. The headset audio system of claim 1, wherein said headset comprises a microphone to record user audio.

15. The headset audio system according to claim 1, wherein at least one of said first and second audio signals comprises multiple audio channels.

16. The headset audio system of claim 1, configured to provide output audio to a user from at least a first, a second, and a third audio signal.

17. The headset audio system of claim 1, configured for gaming applications, wherein said first audio signal comprises user chat audio and said second audio signal comprises game sound.

18. A control unit for a headset audio system that provides output audio to a user from at least a first and a second audio signal, said control unit comprises at least
   a first assignable audio control, and
   a second assignable audio control; wherein
   said assignable audio controls are configured to be switched between at least a first control mode and second control mode; and wherein
   in said first control mode, the first assignable audio control is configured for adjustment of a main volume of said output audio and the second assignable audio control is configured for adjustment of a mixing level between said at least first and second audio signals; and
   in said second control mode, the first assignable audio control is configured for adjustment of a volume of said first audio signal, and the second assignable audio control is configured for adjustment of a volume of said second audio signal.

19. A method of controlling audio in a headset audio system comprising a headset to provide output audio to a user from at least a first and a second audio signal and a control unit, provided to allow user adjustment of one or more audio parameters; said control unit comprising at least a first assignable audio control, and a second assignable audio control; wherein
   said assignable audio controls are switched between at least a first control mode and a second control mode; wherein
   in said first control mode, the first assignable audio control is configured for adjustment of a main volume of said output audio and the second assignable audio control is configured for adjustment of a mixing level between said at least first and second audio signals; and wherein
   in said second control mode, the first assignable audio control is configured for adjustment of a volume of said first audio signal, and the second assignable audio control is configured for adjustment of a volume of said second audio signal.

* * * * *